United States Patent
Edelson

(12)
(10) Patent No.: US 6,614,202 B2
(45) Date of Patent: Sep. 2, 2003

(54) PWM MOTOR DRIVE APPARATUS WITH INCREASE OF LOW SPEED CAPABILITY

(75) Inventor: Jonathan Sidney Edelson, Somerville, MA (US)

(73) Assignee: Borealis Technical Limited, Gibraltar (*) Notice: Subject to any disclaimer, the term of this patent is extended or adjusted under 35 U.S.C. 154(b) by 152 days.

(21) Appl. No.: 09/934,950

(22) Filed: Aug. 21, 2001

(65) Prior Publication Data

US 2002/0074969 A1 Jun. 20, 2002

Related U.S. Application Data

(60) Provisional application No. 60/226,722, filed on Aug. 21, 2000.

(51) Int. Cl.$^7$ ................................................ H02P 7/62
(52) U.S. Cl. ...................................................... 318/727
(58) Field of Search ................................ 318/727, 801, 318/807; 310/185, 179

(56) References Cited

U.S. PATENT DOCUMENTS

| | | | | |
|---|---|---|---|---|
| 4,749,933 A | * | 6/1988 | ben-Aaron | 318/810 |
| 4,751,448 A | * | 6/1988 | Auinger | 318/773 |
| 5,349,517 A | * | 9/1994 | Brennen | 363/40 |
| 5,442,250 A | * | 8/1995 | Stridsberg | 310/186 |
| 5,661,379 A | * | 8/1997 | Johnson | 318/139 |
| 5,852,558 A | * | 12/1998 | Julian et al. | 363/132 |
| 6,198,238 B1 | * | 3/2001 | Edelson | 318/148 |
| 6,208,537 B1 | * | 3/2001 | Skibinski et al. | 363/40 |
| 6,351,095 B1 | * | 2/2002 | Edelson | 318/801 |

* cited by examiner

Primary Examiner—Rita Leykin

(57) ABSTRACT

Maximizing current from a given power inverter in an electrical rotating machine and maintaining the speed of an electrical rotating machine which has more turns of the winding.

31 Claims, 3 Drawing Sheets

PWM MOTOR DRIVE APPARATUS WITH INCREASE OF LOW SPEED CAPABILITY

This application claims benefit of application No. 60/226,722, dated Aug. 21, 2000.

BACKGROUND

The structure of a dynamo electric machine plays an important role in the limits to the mechanical capacity of the machine. A further limiting factor is power electronics capabilities which provide the electrical drive to the motor.

Electric motors are often operated with electronic variable speed drive systems, which adjust the voltage and current being supplied to the motor in order to operate the motor at a desired speed under a given torque load, or to control the torque load to a fixed value, or to otherwise control the mechanical output of the motor. A particularly useful type of variable speed drive is the polyphase alternating current inverter, which may be used to operate polyphase AC motors.

In many applications, a fixed amount of input electrical power is available, and this is to be converted to mechanical output power as needed. It is desirable that the full available electrical power be available for conversion to mechanical power over a wide speed range.

At low speeds, it is often desired to increase the motor output torque, as mechanical output power is the product of torque and speed, allowing the full use of available electrical power. Torque is related to the slot current supplied to the motor windings, the slot current being the total current of all of the conductors wound in parallel through the same slot. The greater the current in each of the windings, the higher will be the slot current. The current in each of the windings is however limited to inverter maximum current ratings.

A further way to increase the slot current is at the design stage, to wind the motor with more stator winding turns. A motor wound with many turns will, for the same input current from the power electronics, produce a greater slot current, and thus more torque, than a motor with fewer series turns. However, this increase comes at a cost; the increased number of series turns raises the voltage of the winding, and increases the voltage required to feed the current into the winding.

At low speeds, this increased voltage requirement is not a problem, as the voltage of a winding is also related to speed, and is lower at reduced speed. However, this increased voltage requirement will decrease the maximum speed at which the inverter can supply sufficient voltage to the motor. Voltage too is limited to inverter ratings.

BACKGROUND—CHANGING RMS VOLTAGE-PEAK AMPLITUDE VOLTAGE RATIO

The maximum voltage that an inverter can produce is set by the DC link voltage; this sets the peak amplitude of the output waveform. If a pure sine wave is synthesized, then the RMS voltage of this sine wave is directly related to this peak value (for sine waves, RMS voltage peak=voltage/v2). However, adding the third harmonic to the waveform can change the relationship between RMS voltage and the peak amplitude value. This technique is well known in the art of three-phase inverter driven machines.

Known to the art of three-phase machines is to selectively add third harmonic to the inverter output waveform. By adding suitable third harmonic to a waveform, the peak amplitude of the waveform is reduced, all the while maintaining the exact same fundamental amplitude. The third harmonic voltage does not cause third harmonic currents to flow into the three-phase machine; so the machine itself sees unchanged fundamental. By then increasing the total amplitude of the waveform, the amplitude of the fundamental component of the output waveform can actually be increased above the peak output voltage of the inverter.

SUMMARY OF THE PRESENT INVENTION

The present invention increases the torque or speed capabilities of a high phase order motor drive system by increasing the utilization of the active switching elements while remaining within the voltage and current limitations of same. A range of harmonics is added to the inverter output waveform to increase the output voltage capacity of the inverter. Harmonics may also be used to adjust the current waveform feeding the motor, thereby increasing the current output capability of the inverter. In a preferred embodiment, the motor is wound with an increased number of series turns to translate the additional available voltage into additional available slot current. In an alternative embodiment, a inverter voltage waveform is synthesized, producing an increased current output.

FIGURES

DETAILED DESCRIPTION OF THE INVENTION

Figure 1A:
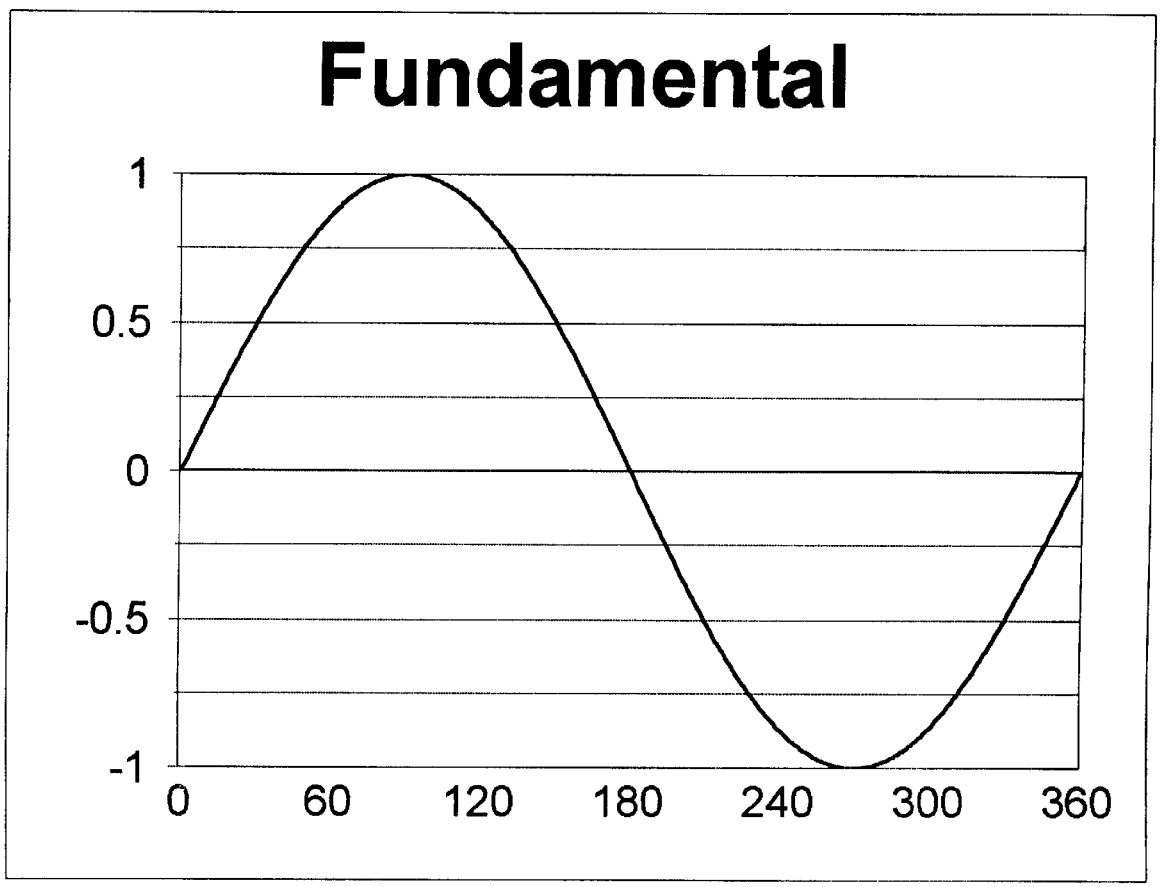
FIG. 1a shows the ratio between peak amplitude voltage and RMS in a sine wave.

The present invention discloses a motor drive system having increased overload capacity at low speeds. Descriptions such as 'increased number of series turns' are made relative to the series turns count determined using conventional design techniques, and calculations for sinusoidal drive. As is well known in conventional motor design practice, the number of series turns is selected to permit the motor to be operated at a desired speed when fed alternating current of a designated voltage and frequency. When a motor is matched to an inverter drive system, the number of series turns is selected such that at the design base speed of the motor, the voltage required by the motor to provide design saturation is the maximum voltage which may be supplied by the inverter. The inverter permits operation both above and below base speed; below base speed the inverter is required to reduce its output voltage, while above base speed the motor must be operated at a reduced flux level.

The voltage and current limitations of the power switching elements in the inverter limit the electrical power which the inverter may deliver to the motor. A third limiting factor is the spectral purity requirement of the motor itself. In general, conventional three-phase machines require essentially pure sinusoidal current flow at the desired drive frequency. The RMS value of a sine wave is only 0.707 times the peak value of the sine wave; thus a substantial portion of the power output capabilities of the switching elements is unutilized because of the spectral purity requirement.

As noted above, well known in the art of three-phase machines is the intentional addition of third harmonic to the output voltage of the inverter. This is simply accomplished using well known techniques to adjust the PWM duty cycle of the output switching elements of the inverter. This third harmonic voltage does not cause third harmonic current to flow through the three phase machine, and thus does not violate the spectral purity requirement. The third harmonic does, however, change the ratio between the RMS value of the waveform and the peak value.

The peaks of the fundamental, desired voltage output correspond to negative peaks in the third harmonic component. Thus when a suitable amount of third harmonic is added to the fundamental waveform, the absolute peak of the composite waveform is actually reduced. It should be noted that the fundamental component of this waveform remains unchanged; it is simply the composite waveform which shows reduced amplitude. If the amplitude of the composite waveform is then increased to the maximum produceable value, then the net result will be a waveform that has a fundamental component which actually has a greater amplitude than the absolute maximum output voltage of the inverter.

In the method of the present invention, a similar technique is utilized to increase the amplitude of the fundamental component of the inverter output. In contrast to the standard technique, several harmonic components are added to the fundamental component to make a composite waveform. Several of these components will flow through the motor, violating the spectral purity requirements of a three-phase machine. This technique is used to supply power to a high phase order motor, such as described in my previous disclosure (EDELSON, U.S. Pat. No. 6,054,837, Date of Patent Apr. 25, 2000), which actively uses these harmonic components.

In the method of the present invention, the harmonic components added to the fundamental component of the inverter output waveform increase the effective maximum output voltage of the inverter. This increase in output voltage may be utilized in a number of different ways.

In one embodiment, the number of series turns in the phase winding set is selected to be that which would be utilized in a design expecting conventional sinusoidal drive. In this case, the increased voltage capability of the inverter may be used to raise the effective base speed of the motor drive system, by permitting the motor to maintain full magnetic saturation at higher speed.

In another embodiment, the number of series turns in the phase winding set is increased above that associated with sinusoidal drive. In this case, the increased voltage capability of the inverter is matched by an increased voltage requirement of the motor. The base speed of the system remains the same; however, the current requirements of the motor operating in any given output state are reduced. This permits the use of power electronic switching elements with a lower current rating, or this permits the same power electronic switching elements to cause greater net slot current, resulting in greater mechanical output.

Embodiments between these two extremes may be used, with the enhancement in inverter output voltage being utilized to increase a combination of speed and ultimate torque.

Figure 1B:
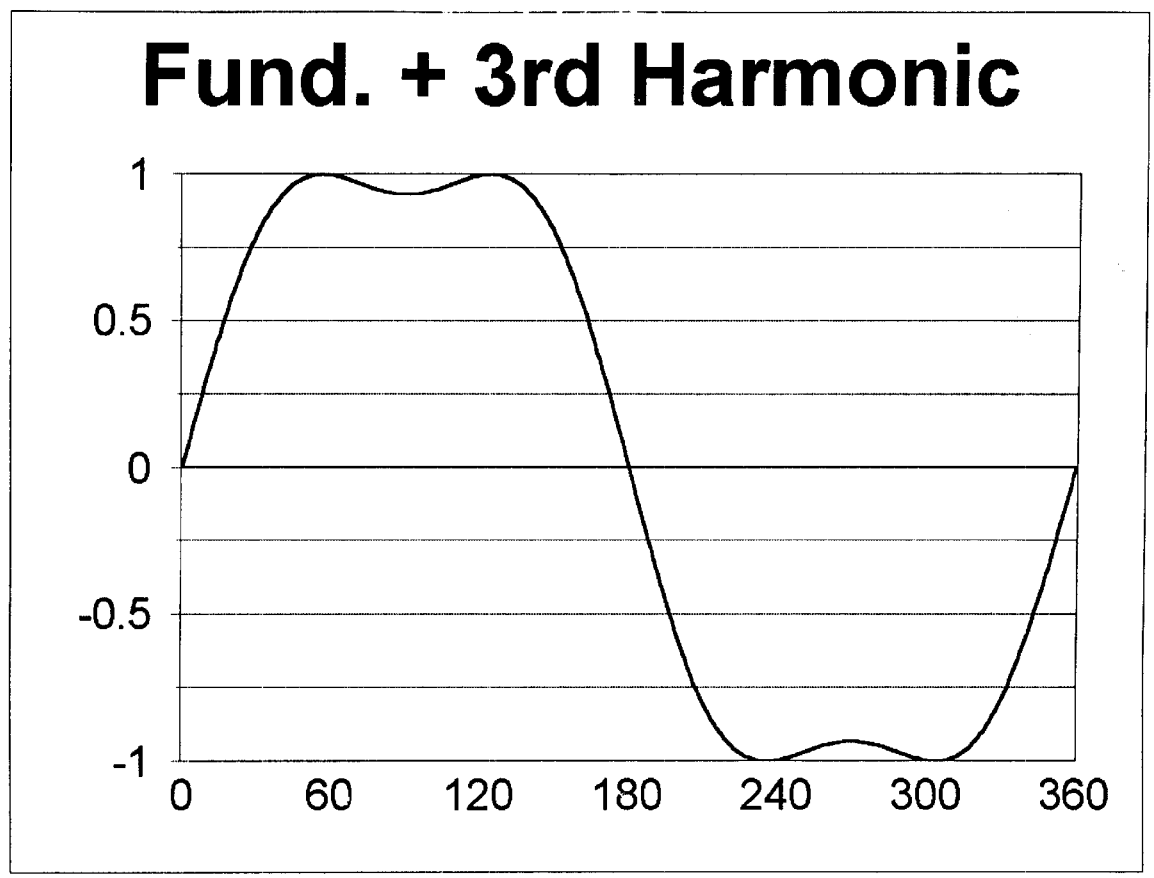
FIG. 1b shows the ratio between peak amplitude voltage and RMS when the third harmonic is added to the waveform in proportions that increase this ratio.
Figure 1C:
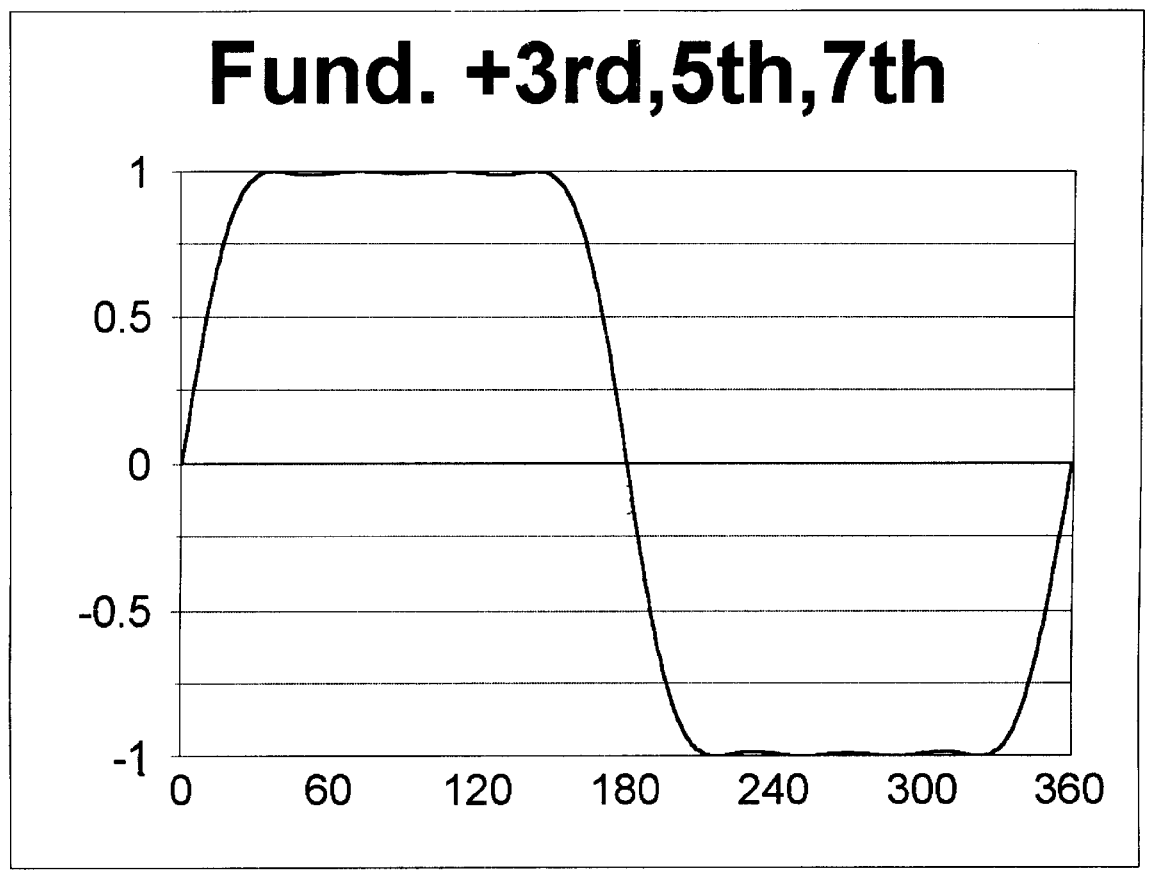
FIG. 1c shows the ratio between peak amplitude voltage and RMS when harmonics up to the $7^{th}$ harmonic are added to the fundamental in proportions that increase this ratio.

In the apparatus of the present invention, power electronic switching elements are controlled to synthesize a desired output waveform. Techniques for this synthesis are well known in the art, and not described in detail. Not as well known in the art is the use of high phase order machinery. In the case of high phase order machinery, the individual inverter phases are essentially the same as those known in the art of three phase machines, more individual inverter output stages are used, and the relative phase angles between the phases are different. The details of producing a non sinusoidal waveform are unchanged between three phase and high phase order machines. The inverter output waveform is synthesized with one or more added harmonics. For example, with reference to FIG. 1b, the third harmonic is added to the waveform. For example, with reference to FIG. 1c, odd order harmonics up to the seventh have been added to the waveform. As is clear, these (in their predetermined proportions) have the effect of broadening the appearance of the waveform, and measurably increase the RMS voltage of the synthesized output while maintaining the same peak voltage. As is well known, when the third harmonic voltage is added to the output of an inverter feeding a machine having three phases, the harmonic voltage will neither cause third harmonic current flow, nor cause third harmonic current flow losses. However, the fundamental voltage impressed upon the terminals of the machine will be increased, and additional fundamental current may flow.

In a higher phase order machine, for example, in a thirty-phase machine, the results of adding harmonic components is rather different. In a high phase order machine, these harmonics will actually flow in the windings. This is even the case when third harmonic components are part of the synthesized inverter output. However, in stark contrast to the three phase machines, these harmonic current flows do not greatly harm efficiency, and in fact beneficially produce torque. In a high phase order machine, all harmonics up to the phase count may be beneficially used to produce torque; thus the RMS content of the waveform may be increased by adding a plurality of odd-order harmonics. When added in correct ratios, these harmonics will also increase the fundamental voltage impressed upon the terminals of the motor.

The basic technique of changing the waveshape of a limiting current flow in order to increase the ratio of RMS value to peak value may also be used during low speed operation. When the motor is operated at low speed, the terminal voltage requirements are greatly reduced, but current requirements remain high. A voltage waveform may be synthesized by the inverter with suitable voltage waveshape so as to cause current to flow in the motor windings, the current waveform having a high ratio of RMS current to peak amplitude current. For a given peak inverter current, this increases the RMS current, and thus the torque available from the motor. Because of the necessary voltage waveform, the RMS versus peak voltage ratio may be harmed; however, for low speed operation this reduction in voltage capability is not a problem, as the motor terminal voltage will be well below inverter capabilities at low motor speed. The change in current waveform will increase the available overload torque during periods when such a waveform is synthesized, whilst allowing for a normal motor operational envelope at all other times.

The techniques of changing current RMS to peak ratio may be combined with the overload torque benefits obtained by changing the voltage RMS to peak ratio and adjusting number of series turns accordingly. In a given motor drive system, the current waveshape and current RMS to peak ratio would dominate during low speed operation when inverter power switch current capabilities are the limiting factor; at high speed the voltage waveshape and voltage RMS to peak ratio would dominate in order to increase inverter output voltage and maintain motor saturation levels.

In the above, the number of series turns may be altered in order to keep the same motor base speed, which would result in decreased inverter current requirements, as described above. The combination of changing the current RMS to peak value with an increase in series turns is entirely practicable, greatly increasing the low speed slot current, and thus low speed inverter limited torque, available from the motor drive system. In general, with an inverter well matched to a motor, this low speed slot current and low speed torque capability will be a time limited overload state, which will result in motor overheating if maintained for an excessive period of time. The time limits for such an overload are strongly dependent upon motor cooling, motor thermal time constant, and the extent of the overload.

As noted above, the ability to increase the inverter voltage RMS output capability may be used either to increase the base speed of the motor by providing sufficient voltage to operate at higher speed, or, by increasing the number of series turns, it may be used to increase the output torque capabilities of the motor drive system. The ability to increase the ratio of current RMS value to current peak value be used to increase the torque available from the motor drive system by directly increasing slot current. Through the expedient of reducing the number of series turns, this increase in inverter output capability may be used to increase the motor base speed while maintaining the same low speed torque capabilities.

The range of these various embodiments may be summarized as follows: changing the voltage waveform to increase the voltage RMS output increases the voltage which the inverter may supply to the motor. Changing the voltage waveform to increase the current RMS output increases the current which the inverter may supply to the motor. These changes in output capability have well known effects upon motor capability, and may be utilized either with the number of series turns calculated for sinusoidal drive, or the number of series turns may be adjusted to accommodate the increase in voltage or current. These changes in inverter output capability may also be advantageously used by reducing the size and cost of the inverter, through a reduction in voltage or current requirements of the power switching elements needed to provide a given motor mechanical output capability.

Preferred Embodiment

In a preferred embodiment, a high phase order induction motor is supplied with electrical power by a high phase order inverter. This high phase order inverter is provided with control means capable of adjusting the output waveform synthesized by the output power switching elements of the inverter. The synthesized waveform consists of the sum of the fundamental component and the harmonic components, in controlled proportion.

As is well known, the output voltage of the inverter must be adjusted in response to different motor operational states.

When possible, the synthesized waveform consists of essentially pure sinusoidal, or fundamental, output. However, when sinusoidal drive would result in a peak voltage amplitude which is greater than the maximum inverter output voltage, harmonic components are added to the synthesized waveform in order to reduce the peak amplitude of the synthesized waveform. As the desired output voltage is increased, additional harmonic components are added. For any given motor drive system of the preferred embodiment, no harmonic components are added which have a harmonic order greater than the phase count.

For any given maximum harmonic order, the maximum RMS voltage which meets the constraints of peak voltage and maximum harmonic component is given by the following table:

5-phase machine: 75% 1st harmonic, 19% 3rd, 6% 5th
7-phase machine: 72% 1st, 19% 3rd, 7% 5th, 2% 7th
9-phase machine: 67% 1st, 19% 3rd, 9% 5th, 4% 7th, 1% 9th
11-phase machine: 60% 1st, 18% 3rd, 10% 5th, 4% 9th, 2% 11th In any high phase order machine, a combination of just fundamental and third harmonic may be used, with optimal proportions being: 84% fundamental plus 16% third harmonic.

As may be seen, even low phase orders offer substantial benefit versus the pure sinusoidal result of an RMS value of 0.707 times the peak value.

Summary Ramifications and Scope

Described in the present specification is a motor/drive system with increased capabilities. Many specific details were given for explanatory purposes, but should not be understood to limit the present invention, which should be construed by the appended claims.

For example, motors were specifically described whilst the invention will be equally applicable to generators and motor/generator combinations with similar benefits of increased output or decreased input, change of ratio of speed to torque input, and/or reduced power electronics. Similarly the invention will also apply to high phase order Linear Induction Motors in which torque may be replaced with perpendicular force.

Additionally, with PWM techniques, we are not limited to operating with pure square waves or the same harmonic proportions throughout operation; square wave operation could be used at high speeds, with sinusoidal excitation used at low speeds, or some other operational mix.

Power electronics was described briefly as inverters; however, many other drive systems are equally applicable. Throughout the present specification and claims, the word inverter should be understood as any drive systems having the same benefits as an inverter with the present invention.

The invention was described with three or specific numbers of phases, but can work with any number of motor phases. The greater the number of phases, the more harmonic numbers can be introduced to the drive waveform which actually increase the current flowing through the motor, instead of causing losses. The number and amount of harmonics added to the waveform is similarly not limited and can even exceed the phase count. While inverters may comprise the ability to create waveforms including harmonics in order to increase the system capabilities, this is not intended to limit the inverter from being able to also produce pure sine waves, or lower ratios of RMS to peak waveform, for use by the motor under different conditions.

What is claimed is:

1. A system, comprising:
   a) an inverter having a number of output phases greater than three; and
   b) a motor connected to and having a corresponding number of phases to said inverter, said inverter for synthesizing phases having an output waveform comprising both fundamental and odd-order harmonic components, and having a ratio of root-mean-square value to peak value of nearly or exactly one, whereby the voltage supplied to the motor relative to the supply voltage is increased above that of sine wave drive.

2. The system of claim 1 wherein said odd-order harmonic components are of harmonic orders less than or equal to said number of phases.

3. The system of claim 1 wherein said odd-order harmonic components are in the proportions that create a substantially square wave.

4. The system of claim 1 wherein said odd-order harmonic components are in the proportions that create a square wave but only include harmonics of up to the phase count.

5. The system of claim 1 wherein said odd-order harmonic components are in the proportions that create a square wave but only include harmonics of up to the phase count, and the harmonic components' proportions are further modified to eliminate Gibbs' Phenomenon.

6. The system of claim 1 wherein said odd-order harmonic components comprises the third harmonic with a ratio to the fundamental of substantially 16:84.

7. The system of claim 1 wherein said odd-order harmonic components comprises the third and fifth harmonics in the ratios of 75% fundamental, 19% third harmonic, and 6% fifth harmonic.

8. The system of claim 7 wherein said inverter is synthesizing five phases, and wherein said motor is a five phase motor.

9. The system of claim 1 wherein said odd-order harmonic components comprises the third and fifth and seventh harmonics in the ratios of 72% fundamental, 19% third harmonic, 7% fifth harmonic and 2% seventh harmonic.

10. The system of claim 9 wherein said inverter is synthesizing seven phases, and wherein said motor is a seven phase motor.

11. The system of claim 1 wherein said odd-order harmonic components comprises the third and fifth and seventh and ninth harmonics in the ratios of 67% fundamental, 19% third harmonic, 9% fifth harmonic and 4% seventh and 1% ninth harmonic.

12. The system of claim 11 wherein said inverter is synthesizing nine phases, and wherein said motor is a nine phase motor.

13. The system of claim 1 wherein said odd-order harmonic components comprises the third and fifth and seventh and ninth and eleventh harmonics in the ratios of 60% fundamental, 18% third harmonic, 10% fifth harmonic and 4% ninth and 2% eleventh harmonic.

14. The system of claim 13 wherein said inverter is synthesizing eleven phases, and wherein said motor is an eleven phase motor.

15. The system of claim 1 wherein said odd-order harmonic components comprise the third harmonic in the proportions of approximately between a sixth to a fifth of the fundamental.

16. The system of claim 1 wherein said odd-order harmonic components comprise the seventh harmonic with a ratio to the fundamental of substantially 3.24:96.76.

17. The system of claim 1 wherein said odd-order harmonics include no harmonics above the phase count.

18. The system of claim 1 wherein said odd-order harmonic components include harmonics beyond the phase count only when the total power increase that they represent by increasing the RMS voltage to peak amplitude voltage ratio, exceeds the power loss factors they introduce into the motor.

19. The system of claim 1 wherein said inverter is a voltage source inverter.

20. The system of claim 1 wherein said inverter is also used for synthesizing the voltage waveform that will drive a current with increased RMS current to peak amplitude current ratio to the motor phases.

21. The system of claim 20 wherein said motor has a decreased winding turn count.

22. The system of claim 1 wherein said inverter is a current source inverter, said inverter for synthesizing the current waveform associated with a voltage drive waveform with increased RMS voltage to peak amplitude voltage ratio.

23. The system of claim 22 wherein said inverter also for synthesizing a current waveform with increased RMS current to peak amplitude current ratio, whereby driving current to the motor increased per inverter current source.

24. The system of claim 22 wherein said motor has an increased winding turn count.

25. The system of claim 1 wherein said motor has an increased winding turn count.

26. A system, comprising:
a) an inverter having a number of output phases greater than three; and
b) an induction motor connected to and having a corresponding number of phases to said inverter, said inverter synthesizing an output waveform, said output waveform being a composite waveform composed of fundamental and odd-order harmonic components, said composite waveform having a ratio of root-mean-square value to peak value substantially greater than peak value/√2.

27. The system of claim 26 wherein said odd-order harmonic components are of harmonic order less than or equal to said number of phases.

28. An apparatus, comprising:
a) an inverter having a number of output phases greater than three; and
b) an induction motor connected to and having a corresponding number of phases to said inverter, said inverter synthesizing an output waveform, said output waveform being a composite waveform composed of fundamental and odd-order harmonic components chosen to drive a waveform current with a ratio of root-mean-square value to peak value substantially greater than peak value/√2.

29. An inverter system for providing drive waveform to a high phase order machine, comprising means for forming drive waveforms with an increased root-mean-squared voltage to peak voltage ratio above that of a sine wave by superimposing one or more odd ordered harmonics upon the fundamental waveform in substantially suitable proportions to increase said ratio, whereby increased voltage will be impressed upon the terminals of the high phase order machine.

30. A method for increasing the overload capability of an inverter fed induction machine comprising:
a) adding more than one harmonic to the fundamental drive waveform of said inverter, to form a composite drive waveform;
b) said harmonics being selected for amplitude and phase such that said fundamental drive waveform is increased in amplitude, and a peak amplitude of said composite drive waveform is reduced, said composite drive waveform having a greater RMS voltage than said fundamental drive waveform;
c) increasing the number of turns in the winding of said inverter fed induction machine, said turn number of said winding being adjusted to maintain suitable magnetic flux with said greater RMS voltage of said composite drive waveform; and
d) reducing the current requirements of said winding, whereby maximum slot current as limited by inverter circuit current limit is directly increased by said increase in turn count.

31. A method of maintaining the speed of an electrical rotating machine which has more turns of the winding, comprising:
a) operating said machine with a phase count higher than 3 whereby harmonics can operate in synchronism with the fundamental wave form;
b) adding harmonics to said wave form to make the wave form more closely resemble a square wave than a sine wave.

* * * * *